United States Patent [19]

Conant

[11] Patent Number: 4,620,686
[45] Date of Patent: Nov. 4, 1986

[54] SPORTFISHING FIGHTING CHAIR

[75] Inventor: Richard W. Conant, West Southport, Me.

[73] Assignee: Warrior Yachts, Inc., Hobe Sound, Fla.

[21] Appl. No.: 666,045

[22] Filed: Oct. 29, 1984

[51] Int. Cl.⁴ .......................................... F16M 13/00
[52] U.S. Cl. .................................. 248/415; 248/418; 297/349
[58] Field of Search .............. 248/415, 416, 417, 418, 248/419; 297/349

[56] References Cited

U.S. PATENT DOCUMENTS

| | | | |
|---|---|---|---|
| 3,642,320 | 2/1972 | Ward | 297/349 X |
| 3,708,203 | 1/1973 | Barecki et al. | 248/416 X |
| 3,839,757 | 10/1974 | Grimes | 297/349 X |
| 3,920,276 | 11/1975 | Sparrow | 248/415 X |
| 3,964,713 | 6/1976 | Joslyn et al. | 297/349 X |
| 4,005,845 | 2/1977 | Luppi et al. | 248/418 X |
| 4,008,500 | 2/1977 | Hall | 297/349 X |
| 4,181,281 | 1/1980 | Kosak | 297/349 X |
| 4,400,032 | 8/1983 | De Polo | 297/349 |
| 4,460,216 | 7/1984 | Keller | 248/416 X |

Primary Examiner—Ramon O. Ramirez
Attorney, Agent, or Firm—Weingarten, Schurgin, Gagnebin & Hayes

[57] ABSTRACT

An articulated seat pedestal including a base and a jointed support which positions a seat through a variable radius. The jointed support includes a first arm pivotally connected to the pedestal base, and a second arm pivotally connected to the first arm and the seat. The first and second arms may be of selectable length and are gear-driven from the pedestal base to achieve the desired variable radius movement of the seat. Moreover, by varying arm length and gear ratio, the elements of the articulated seat pedestal support may be individually selected to conform with the particular dimensions of the fishing boat.

18 Claims, 8 Drawing Figures

SPORTFISHING FIGHTING CHAIR

FIELD OF THE INVENTION

The present invention relates to seat pedestals, and in particular to articulated pedestals for fishing seats permitting movement in a variable radius arcuate path.

BACKGROUND OF THE INVENTION

Fishing seats, traditionally called "fighting chairs," are designed to facilitate the fisherman's ability to follow the course of a hooked fish by mounting the seat on a single pivotal axis. Such seats are restrictive in the limited range of motion possible to the seated fisherman. In view of the finite length of a fishing rod, a fisherman seated in a conventional singe-axis rotational chair risks entanglement of his rod and line and loss of his fish when the fish plays off the end of modern wide-transomed fishing boats. To avoid such entanglement and to follow the fish along the sides, a fisherman seated in a conventional chair must rise from his seat and lose the leverage and stability gained when "fighting" a fish in a seated and secure position.

Other forms of "fighting chairs" have included mounting a platform on a single column about which the apparatus rotates. This seat, as rotational about a single axis, has been used to permit fore-to-aft an starboard-to-port positioning While platforms have been added to provide a support for a fishing rod and foot rest, movement of the chair has been limited to rotation about the single axis.

Previous adjustable chairs have made use of a jointed pedestal where substantially linear movement has been desired relative to the base element. While such a pedestal and attached seat allow the seated person to choose an extent of movement in a fore-to-aft direction, any lateral or arcuate movement is restricted.

Other methods for creating adjustable apparatus incorporate a locking rod into a central telescoping receiving post to permit a limited vertical adjustment of the seat. In order to extend multidirectional movement of an apparatus, another method requires the connection of a series of jointed arms. Folding bed tables, for example, combine jointed arms in a table support to allow correct positioning by a patient. However, none of these methods or apparatus provides the motion appropriate for "fighting chairs."

Other features, such as motorized controls having either foot pedals or hand switches, have been incorporated in seat design to permit a fisherman to control the movement of his seat. These controls, however, are limited to the single rotation axis of the chair. While motorized control certainly facilitates a fisherman's control of his seating direction, it cannot extend the fisherman's reach beyond the limited radius of motion possible from the single-axis support.

BRIEF DESCRIPTION OF THE INVENTION

The "fighting chair" of the present invention provides a variable radius path for the chair, allowing a fisherman to effectively track the path of a fish around the stern of modern, wide-transomed fishing boats. The "fighting chair" includes a mechanical system of powered articulated arms rotating on a plurality of parallel axes, so that a seated fisherman may move his position in at least a 120° arc in either direction from center. Moreover, he may extend the reach possible from his seated position by moving the chair such that the articulated arms align and extend the chair support a distance equal to the combined length of the articulated arms. The present invention is therefore of particular value to a fisherman whose hooked prey plays off the end of the fishing boat transom, beyond the reach of a conventional fishing rod. By moving a seated fisherman and his fishing rod along such a variable-radius path, the present invention effectively and efficiently avoids risk of entanglement of the fishing line on the boat transom.

The articulated seat pedestal for the "fighting chair" comprises a plurality of arms connected by pivots to the chair itself, and to the pedestal base. At closed position, in which the seat is not extended from above the pedestal base by the articulated arms, the vertical axis of the chair pivot is directly over the vertical pivot axis of the pedestal base. Further, at closed position, the vertical axis of the pivot joining the upper and lower arm of the pedestal support is substantially forward of the vertical axis of the pedestal base. As the lower arm rotates to at least 120° from center, the upper arm simultaneously rotates in an opposite direction at least 180° to extend the position of the chair up to the combined length of the upper and lower arms.

The articulated seat pedestal is powered by a rotary actuator, mounted partially subsurface, and is driven by a pumping unit, preferably mounted below the surface of the pedestal base to minimize environmental exposure and damage. The stationary shaft and rotating flange of the actuator provide support for a lower arm. To the distal end of the lower arm, an upper arm is pivotally located. Similarly, to the distal end of the upper arm, a chair is pivotally mounted.

Movement of the articulated pedestal is accomplished by mounting a sprocket to the stationary shaft of the rotary actuator. A cooperating sprocket is mounted to the bottom of the upper arm shaft. Both sprockets are connected by a roller chain, adjustable by an eccentric bushing.

The present invention, incorporating the elements discussed above, therefore allows the fighting chair to be convenviently movable along a variable-radius path. Moreover, by varying the arm length and the gear ratio, the articulated pedestal may be custon-adjusted to move the chair along the most advantageous path possible in limited physical spaces characteristic of modern sport fishing boats.

BRIEF DESCRIPTION OF THE DRAWING

These and other features of the present invention will be better understood from the following detailed description, taken together with the drawing, wherein.

DETAILED DESCRIPTION OF THE INVENTION

Figure 1:
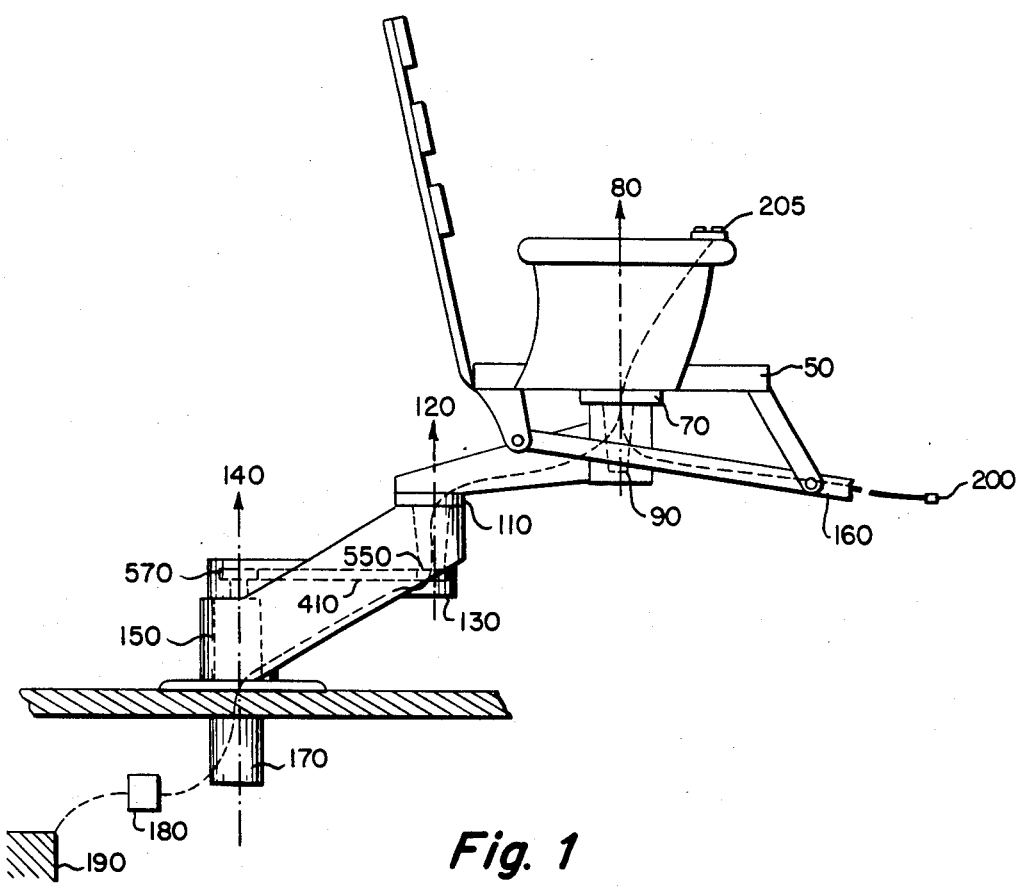
FIG. 1 is a side perspective view of the "fighting chair" at full lateral pivot position, including electrical control system.

A side perspective of the articulated seat pedestal of the present invention is shown in FIG. 1, which includes a seat 50, a pivot 70, a vertical pivot axis 80, an upper arm 90, a pivot 110, a vertical pivot axis 120, a lower arm 130, a vertical pivot axis 140, a rotating flange 150, a rotary actuator 170, and a pumping unit 190. The lower arm 130 is connected to the rotating flange 150, which rotates along vertical axis 140. The upper arm 90 rotates, by pivot 110, along vertical axis 120. Seat 50 rotates on pivot 70 with a vertical axis 80.

At full lateral pivot, the lower arm 130 rotates at least 120° from center, while the upper arm 90 simultaneously rotates in an opposite direction to at least 180° from center to extend the position of seat 50 up to the combined length of upper arm 90 and lower arm 130. Vertical axis 80 is substantially aft and port or starboard or offset relative to vertical axes 120 and 140 when the articulated seat pedestal is in this position.

FIG. 1 further shows the electrical system which controls the articulated seat pedestal: foot pedal switches 200, as disposed on the foot rest 160, and hand switches 205. Switches 200 and 205 are coupled to the reversing relays 180 by control wiring 185 through the interior of upper arm 90 and lower arm 130, and through the rotary actuator 170. In the preferred embodiment, switches 200 and 205 are pneumatically operative. The reversing relays 180 are preferably electric in operation. The preferred embodiment includes foot switches 200, having closed circuit air pressure caused by foot pressure, which cause normally open electrical switches (not shown) contained upper arm to close. The electrical switches are connected to cause pump motor 190 to run either clockwise or counterclockwise to actuate rotary actuator 170. Further, this embodiment of the present invention avoids environmental damage to exposed electrical systems by wiring through the interior of the articulated seat pedestal.

Figure 6:
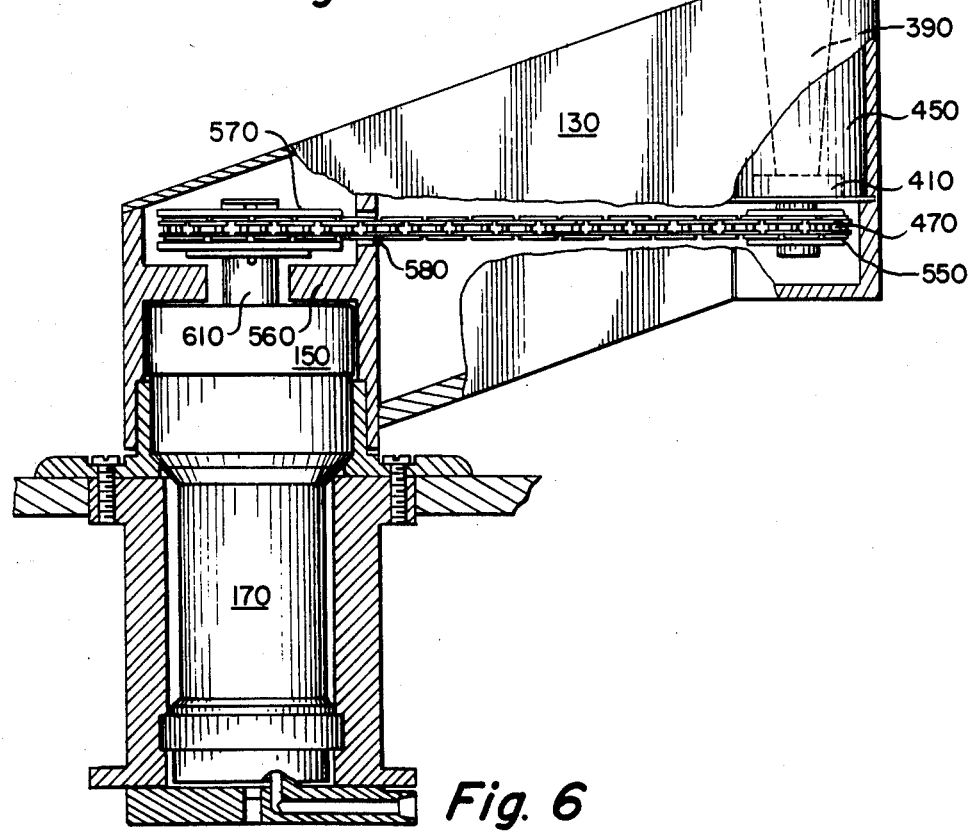
FIG. 6 is a side perspective of the pivot joint between the upper and lower arms.
Figure 7:
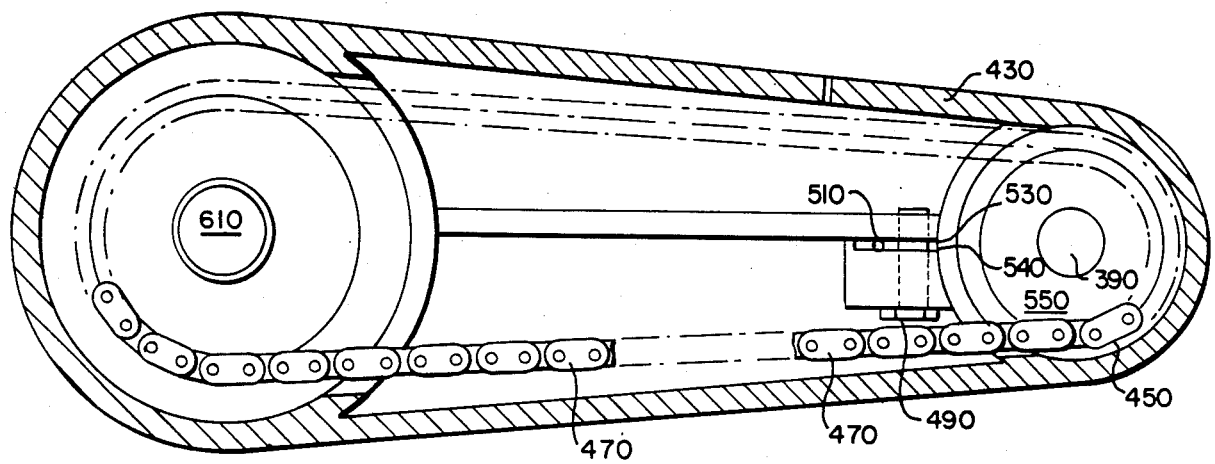
FIG. 7 is a top view of the lower arm showing the sun gear and planetary gear sprockets and roller chain.

The interior detail of lower arm 130 including a planetary gear sprocket 550, a roller chain 470, and a sun gear sprocket 570, are discussed in FIGS. 6 and 7.

Figure 2:
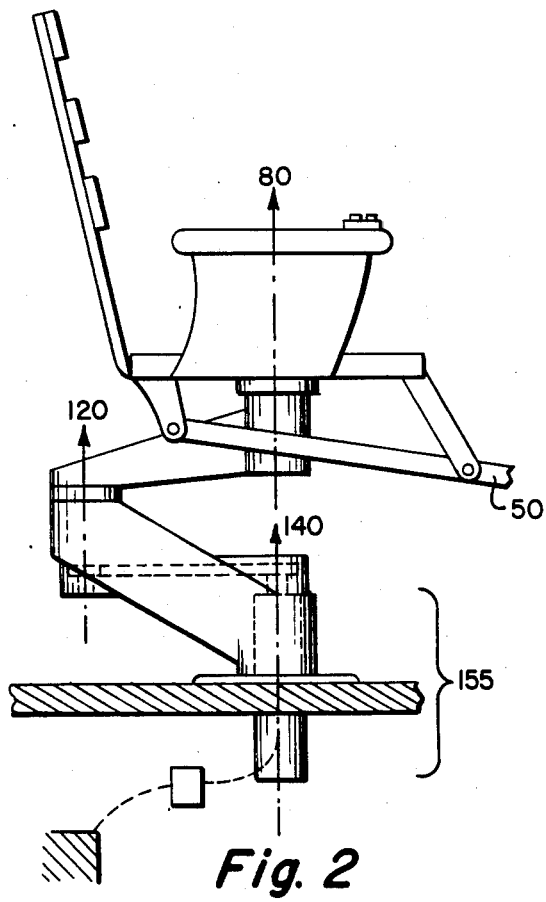
FIG. 2 is a side perspective view of the "fighting chair" in closed position.

FIG. 2 is a side perspective of the articulated seat pedestal of FIG. 1 in closed position. The vertical axes 80 and 140 are substantially aligned so that seat 50 is above pedestal base 155. Further, in this position, vertical axis 120 is posterior to pedestal base 155 and posterior and parallel to vertical axes 80 and 140.

Figure 3:
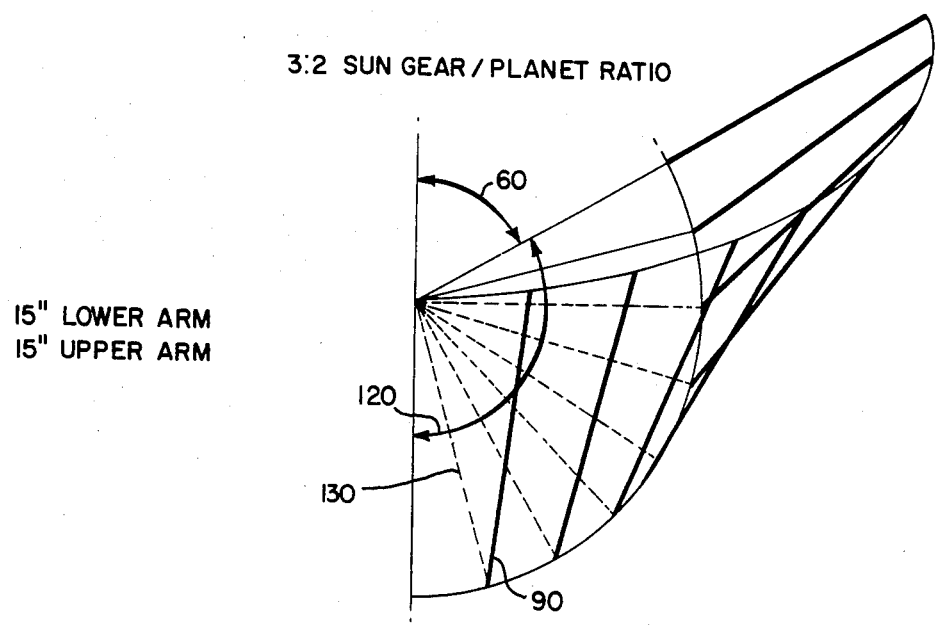
FIG. 3 is a diagram of the variable-radius arcuate path of the articulated seat pedestal at a 3:2 sun gear to planetary gear ratio where both upper and lower arms are of equal length.

FIG. 3 is a diagram of the variable-radius arcuate path of the articulated seat pedestal. In a 3:2 sun gear to planetary gear ratio, where the lower and upper arms are of equal lengths, upper arm 90 and lower arm 130 act in concert to extend the arcuate path of the seat 120° from center. Movement of upper arm 90 and lower arm 130 in 15° increments illustrates the arcuate path of variable radius for the seat attached to this pedestal.

Figure 4:
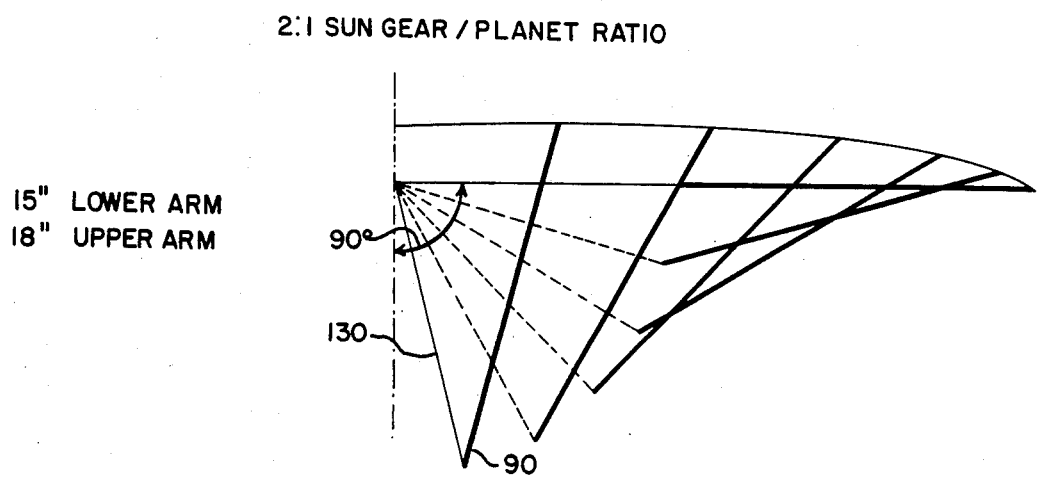
FIG. 4 is a diagram of the variable-radius arcuate path of the articulated seat pedestal at a 2:1 sun gear to planetary gear ratio where the upper and lower arms are of unequal length.

FIG. 4 is a diagram of a 2:1 sun gear to planetary gear ratio, where the upper arm and lower arm of the articulated seat pedestal are of different lengths. In comparison to FIG. 3, as the gear ratio increases from 3:2 to 2:1, the angle formed by the upper arm 90 and lower arm 130 with the boat centerline decreases to 90°. Moreover, by varying the arm length, the shape of the variable-radius arcuate path may be altered.

Figure 5:
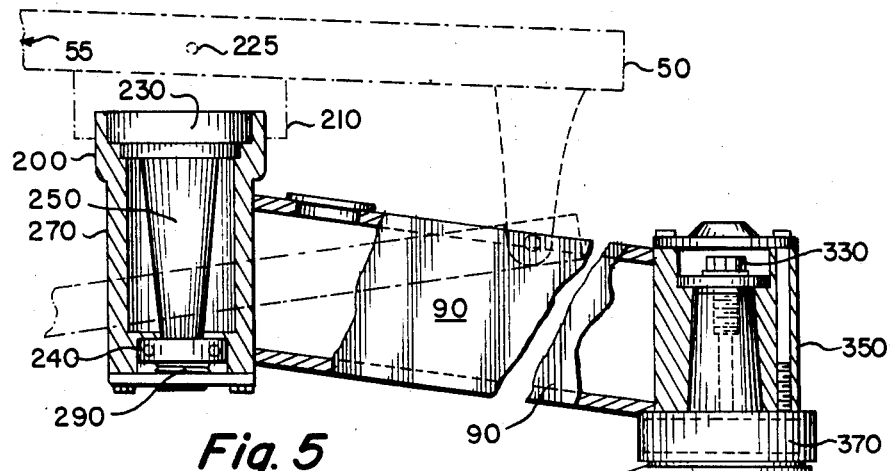
FIG. 5 is a side perspective of the pivot joint between the upper arm and the seat.

FIG. 5 is a side perspective of the pivot between the seat and the upper arm, which includes a seat 50, a seat lock brake band (not shown), ball bearings 230, 240, a shaft 250, a pivot housing 270, a mounting bolt 290, and an upper arm 90. The seat 50 is locked relative to upper arm 90 by pressure-clamping the seat lock brake band to a pivot housing hub 210. By adjustment of a knob 225, a seated fisherman thereby locks the direction he faces relative to upper arm 90. The vector 55 indicates the direction such a fisherman would face while seated on the articulated pedestal and locked seat.

Ball bearings 230 and 240 allow the seat 50 to pivot relative to the upper arm 90. A shaft 250 supports the ball bearings 230 and 240, and is mounted to the hollow pivot housing 270 by the mounting bolt 290.

FIG. 6 is a side perspective of the pivot joint between the upper arm 90 and the lower arm 130. As in FIG. 5, ball bearings 370 and 410 permit rotation of the tapered shaft 390. A mounting bolt 330 connects tapered shaft 390 to pivot housing 350.

In side perspective, a roller chain 470 is shown to travel a planetary gear ssprocket 550 and a sun gear sprocket 570, the spacing being adjustable by means of an eccentric bushing 450. In this embodiment, the sun gear sprocket 570 is fixed in position while the planetary gear 550 is free to rotate by the roller chain 470. By connecting the lower arm 130 to the rotating flange 150 by a mounting bolt 560, the planetary gear 550, as located at the distal end of the lower arm 130, "orbits" the sun gear 570 as the lower arm 130 rotates. The roller chain 470 exits the pedestal base housing 560 through a pedestal base aperture 580.

FIG. 7 is a top view of the lower arm 130. As in FIG. 6, the sun gear sprocket 570 and the planetary gear sprocket 550 are travelled circumferentially by the roller chain 470. An eccentric bushing 450, as located in a split bore 530 of the lower arm 130, permits adjustment for changes in the length of the roller chain 470. The adjustment is locked by a chain adjustment lock 490, which spans the gap formed by the split bore spacing 540. A jack screw 510 is included in this embodiment to urge the spacing 540 of the split bore 530 open. The center oef th fixed sun gear sprocket 570 in FIG. 7 is aligned with the stationary shaft 610 of FIG. 6. A planetary gear sprocket 550 is mounted on the bottom of the tapered shaft 390 of FIG. 6.

Figure 8:
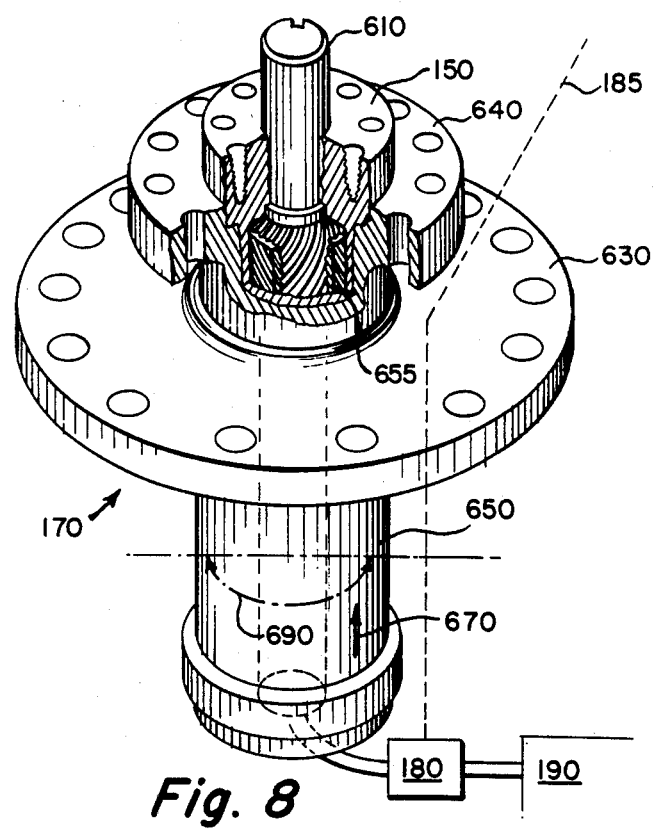
FIG. 8 is a cutaway side perspective of the rotary actuator showing the rotating flange and stationary shaft.

FIG. 8 is a cutaway perspective of the rotary actuator 170, which includes a stationary shaft 610, a housing 640, a rotating flange 150, and a deck flange 630. The rotary actuator 170 is comprised of two moving parts: a piston sleeve 650, which rotates and reciprocates, and an inner sleeve and flange 655 which only rotates. Pressure applied by the pumping unit 190 causes the piston sleeve 650 to be displaced axially according to the axial displacement vector 670. Coincidentally, the piston sleeve 650 rotates during reciprocation, causing additional rotation between the inner sleeve and flange 655 and the stationary shaft 610. Further details regarding the operation of hydraulic rotary actuators, such as the Helac, manufactured by Weyer Machine Co., are incorporated by reference from the associated descriptive literature. The rotating flange 150 may therefore move 120° in either direction from center or a total of 240°. Control wiring 185, as shown, passes through a hole in the stationary shaft 610 and is coupled to reversing relays 180.

The rotary actuator 170 is mounted partially above decks by the deck flange 630. The pumping unit 190 and reversing relays 180 are mounted below decks to avoid environmental exposure and damage.

The present invention is not limited by the above solely exemplary detailed description. Modifications and substitutions by those skilled in the art are considered within the scope of the present invention. Therefore, the present invention is not to be considered limited, except by the following claims.

I claim:

1. Apparatus for positioning a seat through a variable radius path relative to a pedestal base comprising:
   a seat
   an articulated pedestal including a first arm pivotable on a first vertical axis, and connected to said pedestal:
   a second arm connected to said first arm, pivotable on a second vertical axis parallel to said first axis, said second arm terminating at said seat, said seat being connected to said second arm and pivotable on a third vertical axis parallel to said second axis; and
   means for moving and retaining said first and second arm, and said seating in a selected angular relationship to provide said variable radius positioning of said seat along a locus corresponding to said selected angular relationship.

2. An articulted seat pedestal including a base and having an articulated support, comprising:
   a seat
   a first arm and a pivot having a vertical axis, said first arm and said pedestal base being connected to said pivot; and
   means for extending rotation radius of said seat along a selected variable radius arcuate path connected to said first arm and said seat.

3. The articulated seat pedestal of claim 2, further includes a second arm and wherein said means for extending rotation radius includes:
   means for mounting a seat to said second arm including a third pivot means disposed along a third vertical axis; and
   means for locking said seat in relation to said second arm.

4. The articulated seat pedestal of claim 2, wherein said means for extending rotation radius includes a second arm connected to said first arm by a pivot means disposed along a second vertical axis, the second arm also being connected to said seat at the opposite end.

5. The articulated seat pedestal of claim 2, wherein the vertical pivotal axes of said first arm, second arm, and seating means are parallel.

6. The articulated seat pedestal of claim 2, wherein said first arm angles upward and outward from said first pivot relative to said pedestal base, and
   wherein said means for extending includes a second arm angling upward and outward from said first arm.

7. The articulted seat pedestal of claim 2, wherein the vertical axis of said means for extending rotation radius is substantially offset relative to the vertical axis of said first arm pivot means when said seat pedestal is in a minimum radius position.

8. The articulated seat pedestal of claim 7, wherein the vertical axis of said first arm pivot is corresponding to the vertical pivot means axis of said seating means when said seat pedestal is in said closed position.

9. The articulated seat pedestal of claim 2, wherein
   said means for extending rotation radius includes rotation about a single axis to include a maximum rotation of 120° from the center of movement of said pedestal base in a clockwise direction, and rotation about a single axis in a counter clockwise direction; and
   said means for extending rotation radius further includes a second arm connected to the distal end of said first arm, pivoting in a direction of opposite rotation relative to said first arm.

10. The articulated seat pedestal of claim 9, including:
    means for power rotation of at least one of said upper and lower arms to extend rotation of said seat along a variable radius path.

11. The articulated seat pedestal of claim 2, wherein said articulated support includes:
    a plurality of pivot joints connected to said arm and said means for extending rotation radius so that a full lateral pivot said first arm is movable to at least 120° in one direction, and said means for extending rotation radius comprises a second arm moveable to at least 180° in one direction to align with said first arm; and
    wherein said seat has a maximum distance from the vertical axis pivot of said pedestal base equal to the combined length of each arm.

12. The articulated seat pedestal of claim 2, further including foot pedal means; and
    hand switch means, wherein
    said means for extending rotation radius of said seat through a variable radius arcuate path is controlled by at least one of said foot pedal means and said hand switch means.

13. The articulated seat pedestal of claim 12, further including
    a rotary actuator;
    switch means; and
    reversing relays, wherein
    at least one of said foot pedal means and said hand switch means is wired by reversing relays through said rotary actuator.

14. An articulated seat pedestal providing variable radius movement relative to a pedestal base comprising:
    a seat;
    an upper arm pivotally connected at its distal end to said seat;
    a lower arm pivotally connected at its distal end to said upper arm;
    a split bore located at said distal end of said lower arm;
    an eccentric bushing mounted in said split bore;
    a rotating flange connected to said lower arm at its proximal end through which a stationary shaft is mounted;
    a rotary actuator; and
    a pump means;
    wherein said seat is pivotally rotated through a variable radius arcuate path.

15. The articulated seat pedestal of claim 14, wherein said split bore further includes an axis, said axis is parallel to said rotary actuator axis and is removed a distance from it.

16. The articulated seat pedestal of claim 14, wherein said pump means is located subsurface to said pedestal base.

17. The articulated seat pedestal of claim 14, wherein said rotary actuator is located substantially subsurface to said pedestal base.

18. The articulated seat pedestal of claim 14, further including a sun gear sprocket means, planetary gear sprocket means and roller chain means wherein rotation being provided by connection through said roller chain means, of said sun gear sprocket means mounted to said stationary shaft of said rotary activator, and said planetary gear sprocket means mounted to said second arm.

* * * * *